US009354968B2

(12) United States Patent
Wenzel et al.

(10) Patent No.: US 9,354,968 B2
(45) Date of Patent: May 31, 2016

(54) SYSTEMS AND METHODS FOR DATA QUALITY CONTROL AND CLEANSING

(71) Applicant: Johnson Controls Technology Company, Holland, MI (US)

(72) Inventors: Michael J. Wenzel, Oak Creek, WI (US); Andrew J. Boettcher, Wauwatosa, WI (US); Kirk H. Drees, Cedarburg, WI (US); James P. Kummer, Wales, WI (US)

(73) Assignee: Johnson Controls Technology Company, Holland, MI (US)

( * ) Notice: Subject to any disclaimer, the term of this patent is extended or adjusted under 35 U.S.C. 154(b) by 120 days.

(21) Appl. No.: 13/631,301

(22) Filed: Sep. 28, 2012

(65) Prior Publication Data

US 2013/0086010 A1  Apr. 4, 2013

Related U.S. Application Data

(60) Provisional application No. 61/542,101, filed on Sep. 30, 2011.

(51) Int. Cl.
   *G06F 17/30* (2006.01)
   *G06F 11/07* (2006.01)
   *G06Q 10/06* (2012.01)

(52) U.S. Cl.
   CPC .......... *G06F 11/0793* (2013.01); *G06F 11/076* (2013.01); *G06F 11/0727* (2013.01); *G06F 17/30303* (2013.01); *G06Q 10/06* (2013.01)

(58) Field of Classification Search
   CPC .......... G06F 17/30303; G06F 11/0793; G06Q 10/06
   USPC ............................ 707/692; 705/412; 715/771
   See application file for complete search history.

(56) References Cited

U.S. PATENT DOCUMENTS

| | | | | |
|---|---|---|---|---|
| 3,840,855 A | * | 10/1974 | Ameau | H04L 25/03878 714/706 |
| 6,154,681 A | * | 11/2000 | Drees | G05B 15/02 700/100 |
| 7,237,138 B2 | * | 6/2007 | Greenwald et al. | 714/4.3 |
| 2002/0120647 A1 | * | 8/2002 | Amano | G06F 17/2217 715/234 |
| 2003/0149919 A1 | * | 8/2003 | Greenwald | G06F 11/2257 714/43 |
| 2004/0083199 A1 | * | 4/2004 | Govindugari | G06F 17/30303 |
| 2004/0249789 A1 | * | 12/2004 | Kapoor | G06F 17/30303 |
| 2005/0028046 A1 | * | 2/2005 | McArdle | G06F 17/30303 714/48 |
| 2006/0238919 A1 | * | 10/2006 | Bradley | G06F 17/30303 360/128 |

(Continued)

*Primary Examiner* — Pierre Vital
*Assistant Examiner* — Nargis Sultana
(74) *Attorney, Agent, or Firm* — Foley & Lardner LLP

(57) ABSTRACT

A method for detecting and cleansing suspect building automation system data is shown and described. The method includes using processing electronics to automatically determine which of a plurality of error detectors and which of a plurality of data cleansers to use with building automation system data. The method further includes using processing electronics to automatically detect errors in the data and cleanse the data using a subset of the error detectors and a subset of the cleansers.

20 Claims, 9 Drawing Sheets

(56) References Cited

U.S. PATENT DOCUMENTS

| | | | | |
|---|---|---|---|---|
| 2011/0130886 A1* | 6/2011 | Drees | ............... | G05B 15/02 700/291 |
| 2012/0022700 A1* | 1/2012 | Drees | ............... | G05B 15/02 700/276 |
| 2012/0084063 A1* | 4/2012 | Drees | ............... | G06Q 10/06 703/6 |
| 2012/0226670 A1* | 9/2012 | Arcushin | ............... | G06Q 30/06 707/692 |
| 2012/0259583 A1* | 10/2012 | Noboa | ............... | G05B 15/02 702/179 |
| 2012/0317081 A1* | 12/2012 | Duvvoori | ............... | G06F 17/30303 707/692 |
| 2013/0086010 A1* | 4/2013 | Wenzel | ............... | G06F 11/0727 707/692 |
| 2013/0275393 A1* | 10/2013 | Kaldas | ............... | G06F 17/30303 707/692 |
| 2014/0032506 A1* | 1/2014 | Hoey | ............... | G06F 17/30303 707/691 |

* cited by examiner

SYSTEMS AND METHODS FOR DATA QUALITY CONTROL AND CLEANSING

CROSS-REFERENCE TO RELATED APPLICATIONS

The present application claims the benefit of and priority to U.S. Provisional Application No. 61/542,101, filed Sep. 30, 2011, the entire contents of which are hereby incorporated by reference.

GOVERNMENT LICENSE RIGHTS

This invention was made with government support under DE-EE0003841 awarded by the Department of Energy. The government has certain rights in the invention.

BACKGROUND

The present application relates to systems and methods for data detection and data cleansing. The systems and methods described herein may be used with building automation systems such as those used or sold by Johnson Controls, Inc.

SUMMARY

One embodiment of the invention relates to a method for detecting and cleansing suspect building automation system data. The method includes using processing electronics to automatically determine which of a plurality of error detectors and which of a plurality of data cleansers to use with building automation system data. The method further includes using processing electronics to automatically detect errors in the data and cleanse the data using a subset of the error detectors and a subset of the cleansers.

In some embodiments, the processing electronics use information concerning data type to determine which of the error detectors or which of the data cleansers to use with the data.

In some embodiments, the processing electronics use information concerning how the data will be used to determine which of the error detectors or which of the data cleansers to use with the data.

In some embodiments, the processing electronics use information concerning which of the error detectors is used with the data or the type of error determined by the detectors to determine which of the data cleansers to use with the data.

In some embodiments, the plurality of cleansers comprise at least two cleansers chosen from the group consisting of a module that replaces the suspect data with a not-a-number value, a module that replaces the suspect data with a value determined by interpolation, a module that formats the data to a uniform format, and a module that sorts the data.

In some embodiments, the plurality of error detectors comprise at least three detectors chosen from the group consisting of a static bounds error detector, an adaptive bounds error detector, a static derivative bounds error detector an adaptive derivative bounds error detector, and a stuck value error detector.

In some embodiments, the static bounds error detector uses a process comprising receiving a data point having a data value, receiving a minimum and maximum bound information, and flagging the data point as suspect data if the data value is not within the minimum and maximum bounds.

In some embodiments, the adaptive bounds error detector uses a process comprising receiving a critical value and a data window having a window size, receiving data points until the number of data points collected equals the window size, estimating a data spread and a central tendency for the data points in the current data window, receiving a next data point having a data value, and flagging the next data point as suspect data if the absolute value of the difference between the data value and the central tendency is greater than the product of the critical value and the data spread.

In some embodiments, the static derivative bounds error detector uses a process comprising receiving a critical derivative, an initial data point and a next data point, each data point having a data value and a data timestamp, determining a rate of change in data value between the initial data point and the next data point, and flagging the next data point as suspect data if the rate of change is greater than the critical derivative.

In some embodiments, the adaptive derivative bounds error detector uses a process comprising receiving a critical derivative and a growth function, collecting an initial data point having an initial data value and an initial data timestamp and a next data point having a next data value and a next data timestamp, determining a rate of change in data value between the data points by dividing the difference in data values by the difference in data timestamps, flagging the next data point as suspect data if the absolute value of the rate of change in data value between the data points is greater than the critical derivative, and using the growth function to either (a) increase the critical derivative if the absolute value of the rate of change in data value between the data points is greater than the critical derivative, or (b) decrease the critical derivative if the absolute value of the rate of change in data value between the data points is less than or equal to the critical derivative.

In some embodiments, the stuck value error detector uses a process comprising receiving a maximum false alarm rate and a plurality of data points, each data point having a data value and a data timestamp, determining an average time between changes in data value, determining a first critical time based on the average time between changes and the maximum false alarm rate, receiving a next data point having a next data value and a next data timestamp, and flagging the next data point as stuck if the difference between the next data timestamp and the timestamp of the most recent previous data point with a data value different from the next data value is greater than the first critical time.

In some embodiments, the stuck value error detector uses a process further comprising determining a current noise estimate and using the current noise estimate to calculate a noise band, determining an average time between deviations from the noise band, determining a second critical time based on the average time between deviations from the noise band and the maximum false alarm rate, and flagging the next data point as stuck if the difference between the next data timestamp and the timestamp of the most recent previous data point with a data value significantly different from the next data value is greater than the second critical time, wherein a difference in data value between two data points is deemed significantly different if the difference represents a deviation from the noise band.

Some embodiments relate to a method for detecting and cleansing suspect building automation system data using one or more of a plurality of suspect data detectors and data cleansers. Suspect data detectors include a static bounds error detector, a derivative bounds error detector, an adaptive bounds error detector, an adaptive derivative bounds error detector, and a stuck data detector. Data cleansers include modules that replace the suspect data with a not-a-number value, replace the suspect data with an interpolated value, format the data to a uniform format, and sort the data. Processes used by the various suspect data detectors include determining a current noise estimate, determining an average time between changes in data value, and determining an average time between deviations from a noise band.

Alternative exemplary embodiments relate to other features and combinations of features as may be generally recited by the claims.

DETAILED DESCRIPTION OF EXEMPLARY EMBODIMENTS

Referring generally to the figures, systems and methods for data detection and data cleansing in a building automation system are shown. The systems and methods of the present disclosure may be used to receive data, detect data suspected to be bad data, and cleanse the data (e.g., removing or replacing suspect data points). One or more sub-processes may be used to detect suspect data (e.g., using static bounds, static derivative bounds, adaptive bounds, adaptive derivative bounds, stuck data detection, etc.). The sub-processes used for the detection and the cleansing can vary based on the type of data, the type of detected error, and/or the use for the data (e.g., whether the data is for a measurement and verification (M&V) algorithm or a demand response (DR) algorithm).

A building automation system (i.e., building management system) may be or include any system capable of automating the processes of a building. Building automation systems include heating systems, ventilation systems, cooling or air conditioning systems, water systems, power or electrical systems, security systems, audio or video systems, computer data or networking systems, or any other system capable of implementation in a building.

Figure 1:
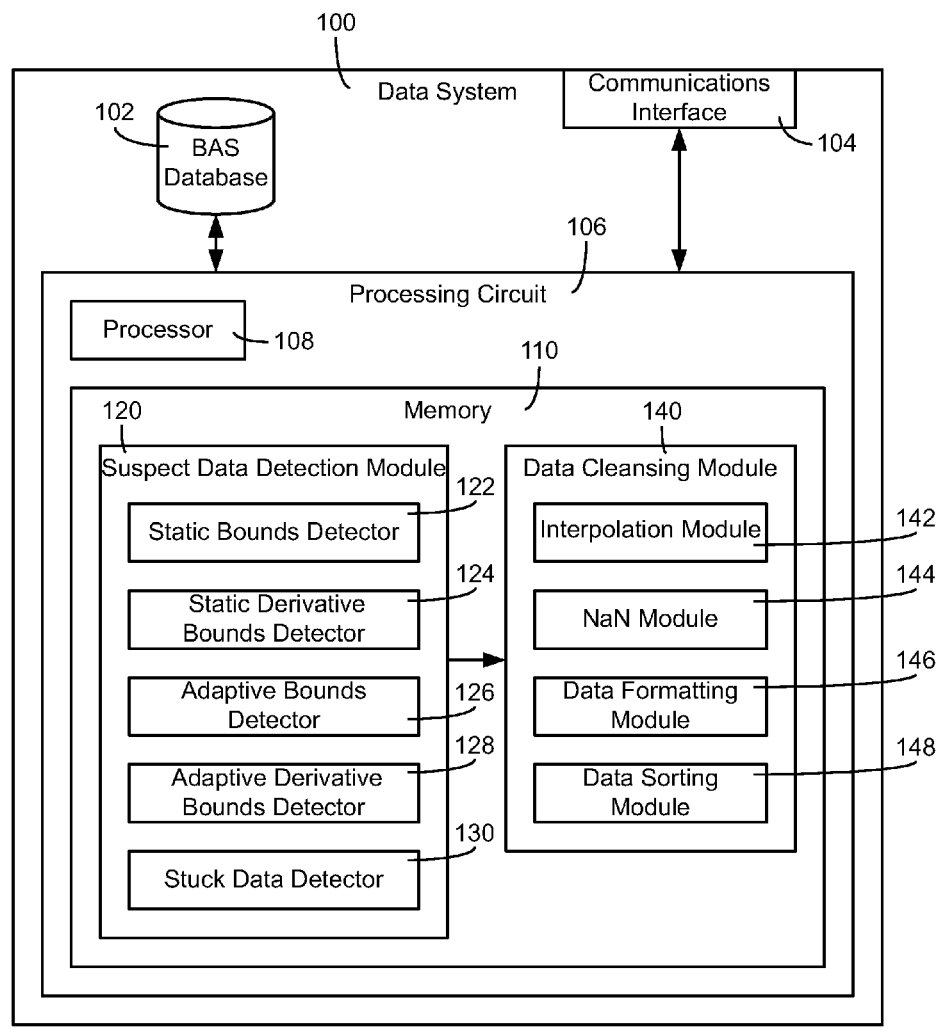
FIG. 1 shows an exemplary embodiment of a data system containing a communications interface, a processing circuit, and memory containing a suspect data detection module comprising a plurality of suspect data detectors and a data cleansing module comprising a plurality of data cleansers.

Referring to FIG. 1, a block diagram of a data system 100 is shown, according to an exemplary embodiment. The data system 100 is configured to receive data from a building automation system (BAS) database 102 or another source and to identify suspect data. The data system 100 then corrects or removes the suspect data and provides the data to a BAS database 102, BAS computer system, a module thereof (e.g., a fault detection and diagnostics module, an M&V module, etc.), or another system. Advantageously, which detectors are used (by suspect data detection module 120) can vary based on the type of raw data being received. Which detectors are used can also vary based on the downstream algorithm calling for the data or with which the data will be used (e.g., M&V, DR, etc.). Further, the cleansers (in data cleansing module 140) that correct or remove the suspect data can adapt to the type of error determined by the detectors. Yet further, one or more of the detectors may dynamically adapt itself (e.g., adapt a threshold) based on statistical processing of the data. The detectors and cleansers described herein can therefore automatically adapt to varying types of raw data that may be supplied by building automation systems 102 having disparate equipment and/or data of varying quality.

The data system 100 shown in FIG. 1 includes a communications interface 104. The communications interface 104 may include wired or wireless interfaces (e.g., jacks, antennas, transmitters, receivers, transceivers, wire terminals, Ethernet ports, WiFI transceivers, etc.) for conducting data communications with local or remote devices or systems.

As shown in FIG. 1, BAS database 102 may be located within the data system 100. Data system 100 and BAS database 102 may be implemented in one or more of a variety of logical locations with respect to the other components of a BAS. Data system 100 may be located in a "cloud"-based system whereby the data within BAS database 102 is received from disparate BAS data sources located at particular building sites while data system 100 is implemented in a cloud system. In other embodiments, data system 100 may be local to a single building automation system. In such embodiments, data system 100 may be located within a METASYS® Application Data Server, Network Automation Engine, or other workstation or server local to the building automation system. In yet other embodiments, data system 100 may be disparately located or dispersed among local computing devices and remote computing devices. For example, a lower level system may include and conduct some of the suspect data detection while a higher level system may include and conduct the remainder and the data cleaning activities. It should be appreciated that in some embodiments each module of data system 100 is a part of the same device. In other embodiments the various modules of data system 100 may be parts of different devices or servers. It should also be appreciated that the modules of data system 100 may be located at the same or different levels of a network topology. Therefore, while data system 100 shown in FIG. 1A is shown as existing within a single device, it should be appreciated that the claims are not limited to implementation within one device, unless expressly required by the claim language.

The data system 100 of FIG. 1 is further shown to include a processing circuit 106 including a processor 108 and memory 110. The processor 108 can be implemented as a general purpose processor, an application specific integrated circuit (ASIC), one or more field programmable gate arrays (FPGAs), a CPU, a GPU, a group of processing components, or other suitable electronic processing components. The memory 110 includes one or more devices (e.g., RAM, ROM, Flash memory, hard disk storage, etc.) for storing data and/or computer code for completing and/or facilitating the various processes, layers, and modules described in the present disclosure. Memory 110 may comprise volatile memory or nonvolatile memory. Memory 110 may include database components, object code components, script components, or any other type of information structure for supporting the various activities and information structures described in the present disclosure. According to an exemplary embodiment, the memory 110 is communicably connected to the processor 108 via the processing circuit 106 and includes computer code (e.g., via the modules stored in memory) for executing (e.g., by the processing circuit 106 and processor 108) one or more processes described herein.

The memory 110 of the data system 100 shown in FIG. 1 includes modules 120, 140 for completing the processes described herein. For example, the memory 110 is shown to include a suspect data detection module 120 and a data cleansing module 140. The suspect data detection module 120 is configured to receive data from BAS database 102 (e.g., data points, name/value pairs, time/value pairs, single values, a data set, raw data) and to determine whether the data should be marked as suspect. It should be noted that BAS database 102 may be stored within memory 110 or external from memory 110 (e.g., as shown, stored in a RAID array, stored in the cloud, stored in a downstream BAS server, etc.).

Suspect data detection may include, for example, determining whether the data is in the correct format, whether the data is or includes a statistical outlier, whether the data is distorted or "not a number" (NaN), whether the data is statistically reliable, whether the data is within statistical bounds, or whether the data is associated with a certain behavior (e.g., a stuck damper). While a set of detectors 122-130 is shown in FIG. 1, in other embodiments more, fewer, or different detectors may form a part of suspect data detection module 120. The data cleansing module 140 is configured to receive identifications of suspect data from the suspect data detection module 120. The data cleansing module 140 may receive an identification of the detector 122-130 that identified the suspect data and/or other information describing the suspect data or its source. The data cleansing module 140 uses such identifications and information to remove, change, or otherwise fix the suspect data in the data collection.

Once raw data is cleansed, the data cleansing module 140 may provide the data to other modules of the processing circuit 106, provide the cleansed data outside of the data system 100 via the communications interface 104, store the cleansed data back in the BAS database 102, push the cleansed data to a cloud system, push the cleansed data back to particular BAS or subsystem, or otherwise use the cleansed data in BAS operations (e.g., in a fault detection and diagnostics algorithm, in a measurement & verification algorithm, etc.).

The suspect data detection module 120 illustrated in FIG. 1 is shown to include modules 122-130 for detecting suspect data. In the exemplary embodiment, the suspect data detection module 120 includes a static bounds detector 122. The static bounds detector 122 compares received data to static bounds (e.g., user established or otherwise, a preselected lower bound and an upper bound). The static bounds may relate to a known threshold for which a data point should not or cannot properly be above or below at a given time and/or for a given type of data. The data points in a data set are compared to the static bounds and if a data points falls outside of the range defined by the static bounds, the data point is marked as suspect data.

The suspect data detection module 120 may further include a static derivative bounds detector 124. The static derivative bounds detector 124 determines the rate of change in data values between two or more data points in a data set and compares the measured rate of change to one or more static bounds or threshold. The measured rate of change may be based on two consecutive data points, two non-consecutive data points, or an average rate of change over multiple data points. If the rate of change falls outside the bounds (e.g., the rate of change is greater than the upper bound or less than the lower bound), then one of more of the data points used to calculate the rate of change is marked as suspect data. In this way, the static derivative bounds detector 124 may function as a "spike filter." A user may configure whether both the first and second data point should be marked as suspect data, whether only the first data point should be marked as suspect data, or whether only the second data point should be marked as suspect data. In some embodiments the static derivative bounds detector 124 can select which of two or more points to mark as suspect data. For example, if the change between two data points exceed a threshold, the detector 124 may evaluate which of the two data points is most dissimilar to previous and subsequent data. The most dissimilar point may be the point marked as suspect data.

The suspect data detection module 120 may further include an adaptive bounds detector 126. The adaptive bounds detector 126 determines bounds (e.g., a lower bound and an upper bound) for a data set by adaptively or dynamically calculating or determining a critical value for the data set. The critical value is then used to adaptively or dynamically set bounds (e.g., a range) within which the data points (e.g., of the set, next data points, etc.) should fall. The data points in a data set are compared to the bounds, and if a data point falls outside of the range defined by the bounds, the data point is marked as suspect data. The process of using adaptive bounds to detect suspect data is described in greater detail in reference to FIG. 2.

The suspect data detection module 120 may further include an adaptive derivative bounds detector 128. The adaptive derivative bounds detector 128 determines one or more dynamic boundaries for the rate of change between two or more data points in a data set. A growth function may be used by the adaptive derivative bounds detector to adjust the dynamic boundaries in response to statistical changes (e.g., growth in the data due to a very warm day, etc.) of the underlying raw data. While a static derivative bounds detector 124 may be reasonably accurate when the maximum rate of change that is physically possible is known, the adaptive derivative detector 128 may better detect suspect or anomalous data by adaptively raising the thresholds when statistical processing indicates relatively rare or noisy raw data. In the exemplary embodiment, a rate of change between data points is calculated and compared to dynamically selected bounds. If the rate of change falls outside of the bounds (e.g., the rate of change is greater than an adaptively calculated critical derivative value), the data is marked as suspect data. In this way, the adaptive derivative bounds detector 128 may function as a "spike filter." An exemplary process of using an adaptive derivative bounds detector to detect suspect data is described in greater detail in reference to FIG. 3.

The suspect data detection module 120 may further include a stuck data detector 130. The stuck data detector 130 determines if one or more data points are "stuck" at or near a particular value. For example, if a sensor is not operating correctly and is providing inaccurate data (e.g., the variance between data points is unnaturally low), the stuck data detector 130 may determine that the data provided by the sensor are 'stuck' and therefore is suspect data. An exemplary process using the stuck data detector 130 to detect suspect data is described in greater detail in reference to FIG. 4.

The suspect data detection module 120 may further include other detectors or modules for detecting suspect data. For example, the suspect data detection module 120 may include a detector for detecting data that is not in a correct format, data that meets type-specific errors, data that is not a number, or otherwise inappropriate for a particular use.

The data cleansing module 140 is shown to include modules for changing or removing suspect data. For example, the data cleansing module 140 is shown to include a data formatting module 146 and data sorting module 148. The data formatting module 146 may be configured to ensure that like data is in the same correct format (e.g., all time-based variables are in the same terms of hours, days, minutes, etc.). The data formatting module 146 may receive information about the data from the suspect data detection module 120 regarding the format of the data set, and may use the information in a process to ensure that all data in the data set is in the correct format (e.g., a format suitable for further processing). The data sorting module 148 may be used to sort the data in the data set for further analysis and for delivery to a BAS computer system or other BAS component.

The data cleansing module 140 may further include an interpolation module 142. The interpolation module 142 is configured to replace a suspect data point in a data set via interpolation of the data set. The interpolation may be linear interpolation, quadratic interpolation, or any other type of non-linear interpolation. For example, given a suspect data point in a data set, interpolation may be used to change the value of the suspect data point such that the new value of the data point "fits" in a curve or graph of the other data points in a data set or fills in a "gap" in the data set. Such a calculation may allow the data point to have a minimal impact on various calculations and processes that make use of the data set.

The data cleansing module 140 further includes a Not a Number (NaN) module 144. The NaN module 144 is configured to receive suspect data points in a data set from the suspect data detection module 120 and to convert the suspect data into a NaN format. By converting the suspect data into a NaN format, calculations and processes of the BAS will ignore the suspect data.

The type of cleansing or the cleansing module utilized can depend on the type of error, the type of data, or the detector which marked the data as suspect. The type of cleansing or cleansing module used may also depend on the intended future use of the data, the algorithm calling for the data (e.g., M&V, DR), or any other reason likely to favor one data cleanser over another. The data cleansing module may be selected automatically or may be user selected. For example, data system 100 may prompt a user to select a data cleanser to use with the suspect data when suspect data is detected.

Figure 2:
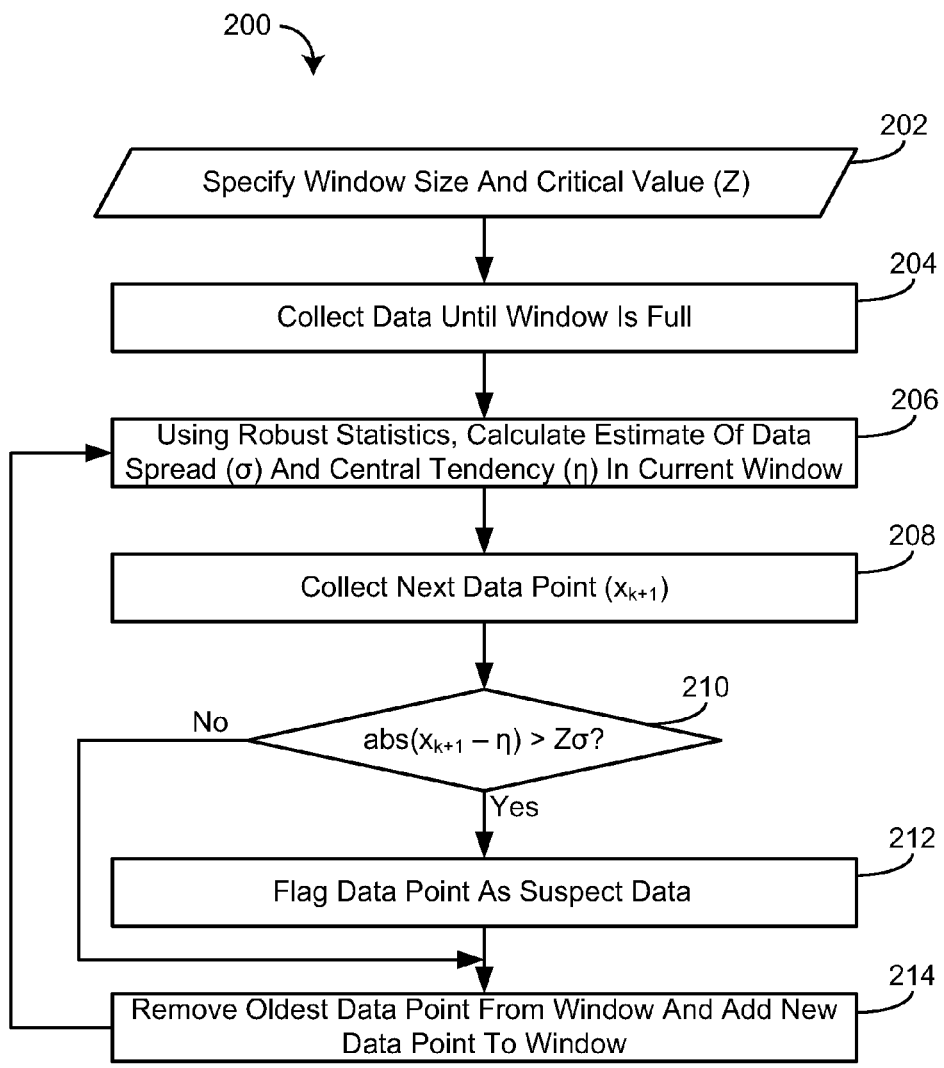
FIG. 2 is a flowchart showing an exemplary embodiment of an adaptive bounds error detection process.

Referring to FIG. 2, a flow chart 200 of a process for suspect data detection is shown, according to an exemplary embodiment. The process 200 uses an adaptive bounds process to identify and flag suspect data. The parameters used throughout the adaptive bounds process 200 can be set by the data type, the algorithm type (e.g., the algorithm with which the detector will be used), or user selected.

The process 200 includes specifying a window size and critical value (Z value) (step 202). The window size relates to the number of data points to use for the suspect data detection process. The number of previous data points to use may be determined automatically (e.g., a statistically significant number of data points may need to be chosen in order for the suspect data detection process to be accurate), may be determined by a user, or may simply be the total number of data points available. The critical value may be a multiplier for setting a threshold value or range for determining a minimum bound and maximum bound for the suspect data detection process.

The process 200 further includes collecting data until the data window is full (e.g., by randomly selecting data points, by selecting the most recent data points, etc.) (step 204). The process 200 then further includes calculating an estimate of the data spread ($\sigma$) and the central tendency ($\eta$) of the data in the data window (step 206). The estimate of the data spread $\sigma$ may be the range of the data (e.g., the difference between the second highest value and second lowest value in a data set), a value based on the variance or standard deviation of the data set, or another value to describe a characteristic of the data spread. The central tendency $\eta$ of the data may be the mean of the data set, median of the data set, mode of the data set, a weighted average of the data set, another average of the data set, or another value that describes the central tendency of the data.

After calculating the data spread and central tendency, a next data point (e.g., a data point $x_{k+1}$ among data points x) is selected for testing (step 208). The difference between the selected next data point $x_{k+1}$ and the central tendency $\eta$ of the data is calculated. The difference ($|x_{k+1}-\eta|$) is then compared to the estimate of the data spread multiplied by the critical value ($Z\sigma$) (step 210). $Z\sigma$ is representative of the maximum difference that the data point should have compared to the average or median of the values in the data set. If the difference is greater than $Z\sigma$, the data is determined to be suspect data (step 212).

The process 200 further includes removing the oldest data point and adding a new data point to the window (step 214). After the change, the process 200 then recalculates the estimate of the data spread $\sigma$ and the central tendency $\eta$ for the new data window (step 206) and repeats the process for another data point (steps 208-212).

Figure 3:
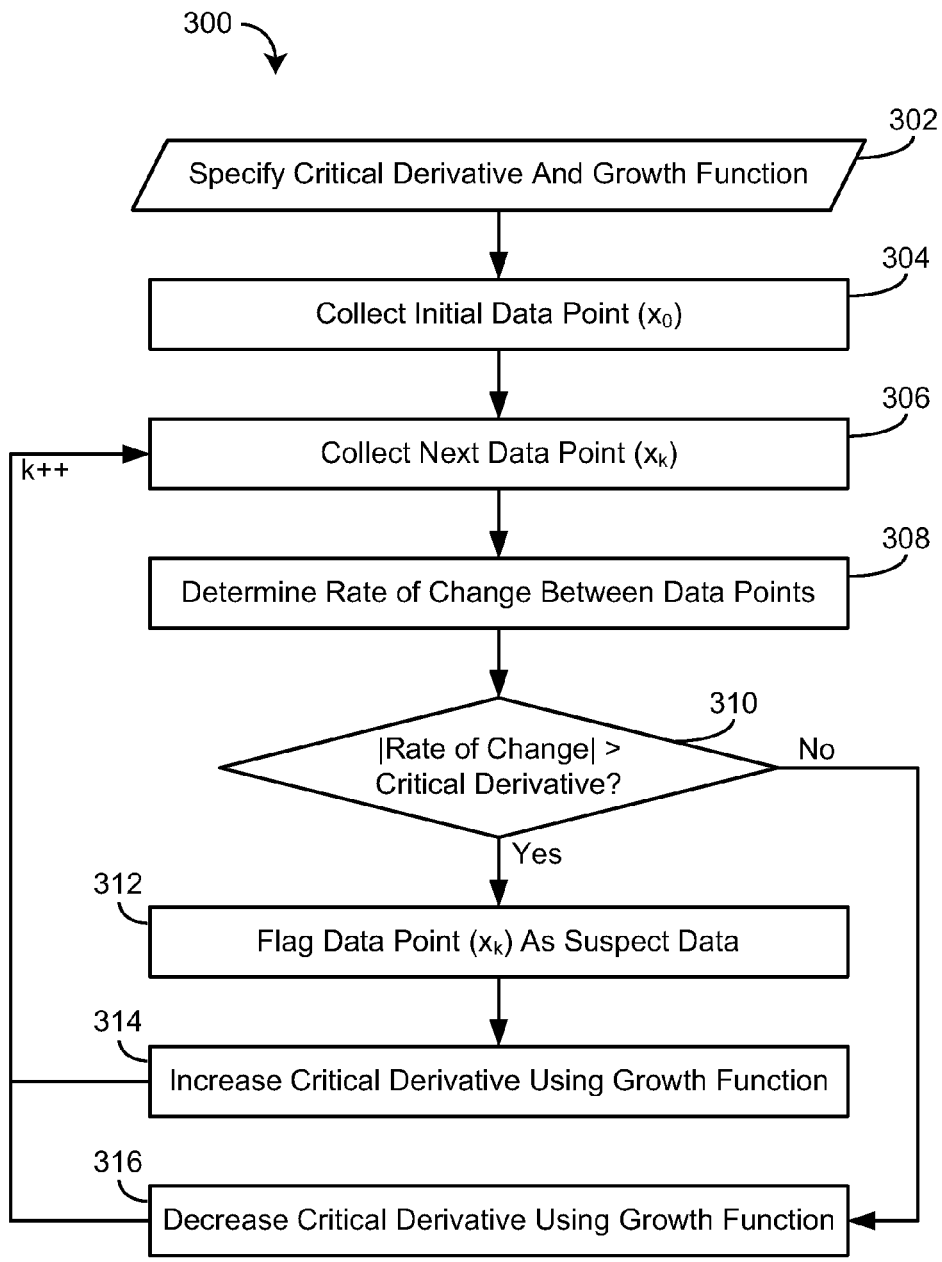
FIG. 3 is a flowchart showing an exemplary embodiment of an adaptive derivative bounds error detection process.

Referring to FIG. 3, a flow chart of a process 300 for using adaptive derivative bounds to identify and flag suspect data is shown, according to an exemplary embodiment. The process 300 includes specifying a critical derivative and a growth function (step 302). The critical derivative may be calculated, specified as a parameter for the function, or chosen by a user. The critical derivative represents a value for which the rate of change between two or more data points should not exceed. The derivative is a representation of the rate of change between data points, and if the rate of change is too high, the process 300 may determine the one or more data points used in the function whose derivative is too high are suspect data points. The growth function is a function used to increase or decrease the critical derivative based on statistics applied to the data. For example, the growth function may be applied as a multiplier to the critical derivative. The multiplier may be changed as described in reference to FIG. 6.

The process of FIG. 3 further includes collecting an initial data point $x_0$ (step 304) and a second data point $x_k$ (step 306). The second data point may be the next data point in a data set or may be one or more points removed from the initial data point. Using the two data points, a rate of change is calculated between the data points (step 308).

The absolute value of the rate of change is compared to the critical derivative (step 310). If the absolute value of the rate of change is greater than the critical derivative, the second data point $x_k$ is flagged as a suspect data point (step 312). At every iteration of the data analysis loop, the growth function may be used to increase (step 314) or decrease (step 316) the value of the critical derivative (e.g., increasing the maximum rate of change between data points that will be accepted by the process of FIG. 3). For example, the growth function for increasing the critical derivative (step 314) may include incrementing the multiplier applied to the critical derivative based on current data trends. If the second data point is flagged as suspect data (step 312), the critical derivative is increased at step 314. The growth function is described in greater detail with reference to FIG. 6.

If the rate of change between two data points is less than the critical derivative, the second data point is accepted. The growth function is then applied to the critical derivative in order to decrease the critical derivative (step 316). For example, the growth function for decreasing the critical derivative may include decrementing the multiplier applied to the critical derivative by a small amount.

Figure 4:
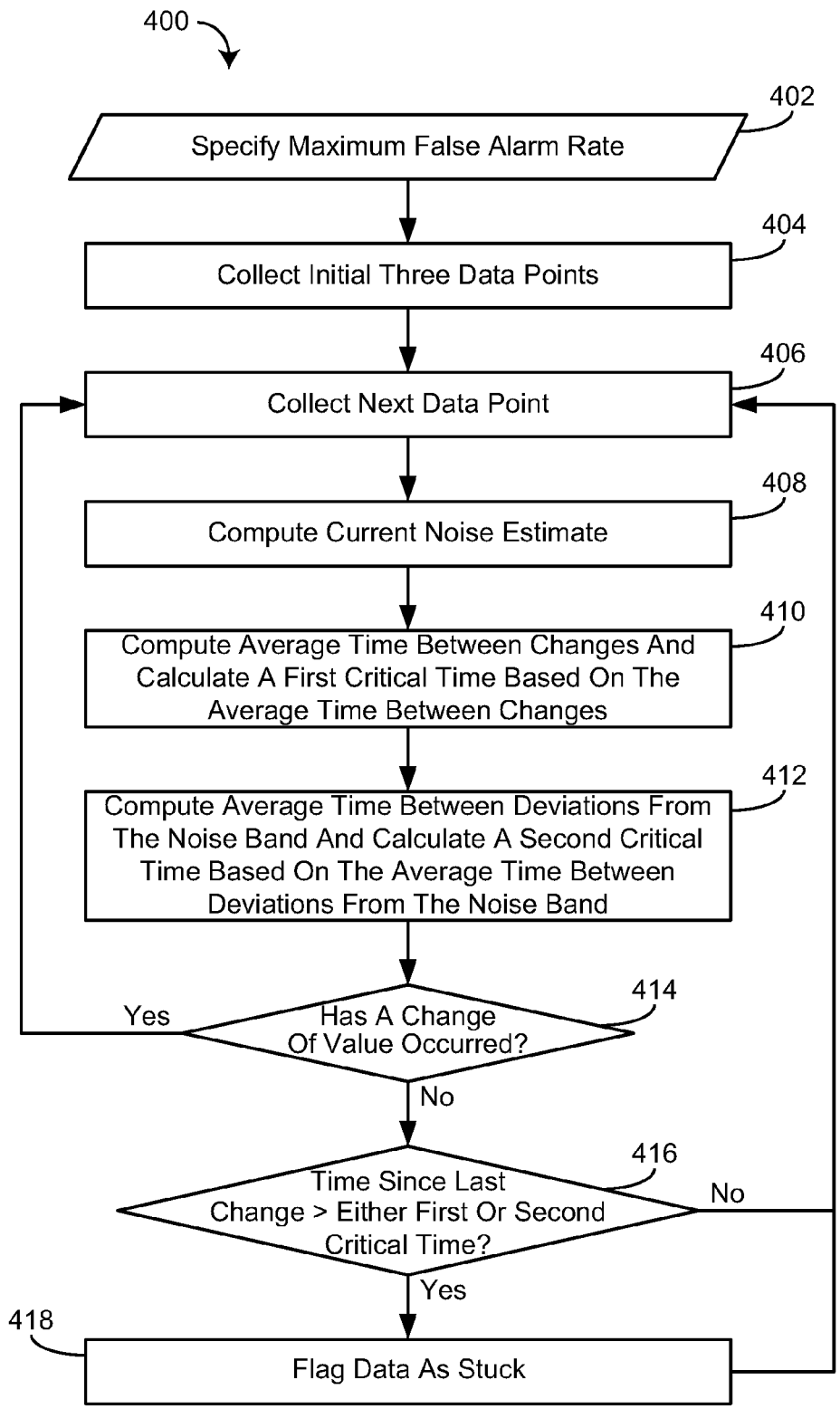
FIG. 4 is a flowchart showing an exemplary embodiment of a stuck data detection process.

Referring to FIG. 4, a flow chart 400 of a process for using a stuck data detection process to detect suspect data is shown, according to an exemplary embodiment. The stuck data detection process 400 determines whether multiple consecutive data points have stayed at a given value or within a margin of a given value for a statistically significant amount of time.

The process 400 includes specifying a maximum false alarm rate (step 402). The maximum false alarm rate may be user set, predetermined based on the data type, predetermined based on the time constant of the data, or otherwise set. The maximum false alarm rate may be an allowed probability of a false alarm in a given time frame (e.g., the allowed probability of false alarms in one month). The maximum false alarm rate is used by the process 400 to set a critical time, to compare against a time since a change has occurred in values of the data points. The specific usage of the maximum false alarm rate is described in greater detail in reference to FIG. 7.

In some embodiments, the process 400 further includes collecting an initial set of three data points to use for stuck data detection (step 404). A larger set may be collected, in varying alternative embodiments. The process 400 further includes collecting the next data point to use for stuck data detection (step 406).

The process 400 further includes computing a current noise estimate (step 408). The current noise estimate may be used to determine the effect of noise on the data points. For the first iteration of the process 400, the current noise estimate may be set to a default of zero. The current noise estimate may be calculated based on the number of iterations completed in the process 400 and the noise estimate determined in one or more previous noise estimations. The current noise estimation process includes calculating a residual variance and estimate of a standard deviation of the data points being tested. The current noise estimation process further includes using an exponentially weighted moving average (EWMA) calculation to smooth the current estimate of the standard deviation. This smoothed estimate is used as the current noise estimate. Computing a current noise estimate is described in greater detail with reference to FIG. 9.

The process 400 further includes computing an average time between changes and calculating a first critical time based on the average time between changes (step 410). The calculation of the first critical time may be accomplished using an inverse F-distribution, as described in greater detail in reference to FIG. 7. The first critical time is representative of a period of time during which a change in data value is expected. If there is no change in data value for a period of time exceeding the first critical time, it may be determined that the data points are faulty (e.g., the sensor providing the data or communication between the sensor and BAS database is stuck).

The computation of the average time between changes includes counting the number of changes in data points in a data set. Each time a next data point has a (significantly) different value, a change is identified. Using the total number of changes, and the length of time over which such changes occurred, the average time between changes is determined. The average time between changes and the false alarm rate is then used to determine the first critical time. The first critical time is a period of time over which it is determined that the signal or sensor is stuck if the values have not changed. The calculation of the first critical time may be accomplished using an inverse F-distribution. The exact process is shown in greater detail in reference to FIG. 7.

The process 400 further includes computing an average time between deviations from the noise band and calculating a second critical time based on the average time between of deviations from the noise band (step 412). The calculation of the second critical time may be accomplished using an inverse F-distribution. The second critical time is representative of a period of time for which a deviation in data value from the noise band is expected. If there is no deviation from the noise band for a period of time exceeding the second critical time, it may be determined that the data points are faulty. For example, if temperature data points indicate that the temperature remains within a certain band (e.g., 1 degree) for a period of time that exceeds the second critical time, it may be determined that the data is faulty because temperature values this consistent are not expected given the time frame (e.g., a couple of days).

The computation of the average time between deviations may include counting the number of such deviations. If a change has occurred to a data point value in a data set in the same direction as a previous data point value change (e.g., the data point value increases or decreases again), a time variable is increased that represents the amount of time since the last change of direction. If a change has occurred to a data point in an opposite direction, however, the time variable is reset and the number of deviations is increased by one. In this way, data that may have occurred after a setpoint change or from a load disturbance does not skew the average time between changes during steady-state control. In other words, data that changes consecutive times in the same direction is not considered when calculating the average time between changes. Using the total number of deviations and the amount of time over which such deviations occur, an average time between deviations is calculated. The average time between deviations and the false alarm rate are then used to determine the second critical time. The second critical time indicates a period of time over which it may be determined that the data is faulty if the data values do not deviate from the noise band. The calculation of the second critical time may be accomplished using an inverse F-distribution, as shown in greater detail in reference to FIG. 7.

The process 400 further includes determining if a change of value occurred (step 414). A change in value may be any change in value, no matter how small, or may be a significant change in value (e.g., a deviation from the noise band). If a change of value did occur, then the data point is not stuck and the process repeats by collecting a new data point at step 406.

On the other hand, if a change of value did not occur, the process 400 includes determining whether the time since the last change of value is greater than either the first or second critical time (step 416). If the time since the last change exceeds either critical time, the data point is marked as suspect (e.g., stuck) (step 418). In some embodiments, all of the data points between the suspect data point and the most recent previous change (either in value or in direction) may be marked as suspect data as well since they too may be stuck.

If the time since the last change is still less than either critical time, the process collects another data point at step 406 and again checks whether a change in value has occurred. The process 400 continues this loop until a change has occurred or one or both critical times have been exceeded.

Figure 5:
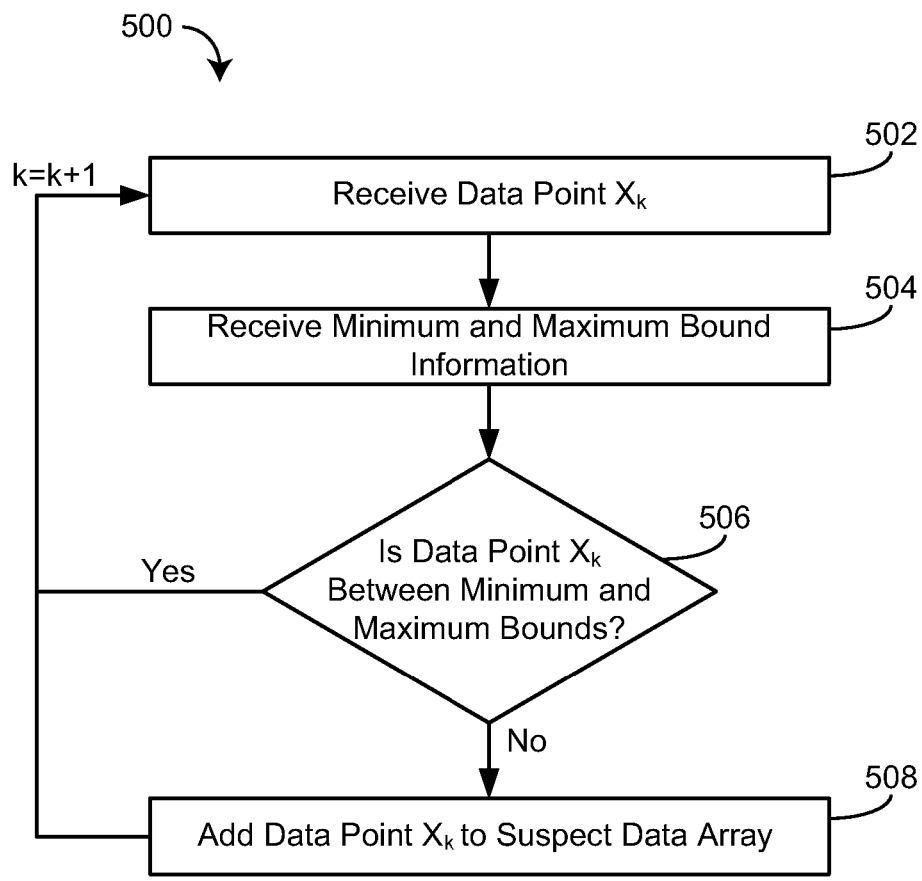
FIG. 5 is a flowchart showing an exemplary embodiment of a sub-process which can be used in either the static bounds error detection process or the adaptive bounds error detection process to compare the value of a data point against minimum and maximum bound information.

Referring now to FIGS. 5-9, exemplary sub-processes for completing the various processes of the present disclosure is shown. Referring more specifically to FIG. 5, a flow chart illustrating a process 500 for checking a value relative to minimum and maximum bounds is shown. In an exemplary embodiment, the process 500 involves receiving a data point $x_k$ in a data set (step 502) as well as minimum and maximum bound information (step 504). For each data point $x_k$ in the data set, the process 500 determines whether the data point $x_k$ has a value between the minimum bound and maximum bound (step 506). If the value of the data point $x_k$ is out of bounds, the process flags the data point $x_k$ as suspect data by adding it to a suspect data array (step 508). The process 500 may be used with a static bounds process or with an adaptive bounds process 200 as described in FIG. 2. For example, the routine calling the process 500 may include data spread σ and central tendency η information for defining the bounds as described in FIG. 2.

Figure 6:
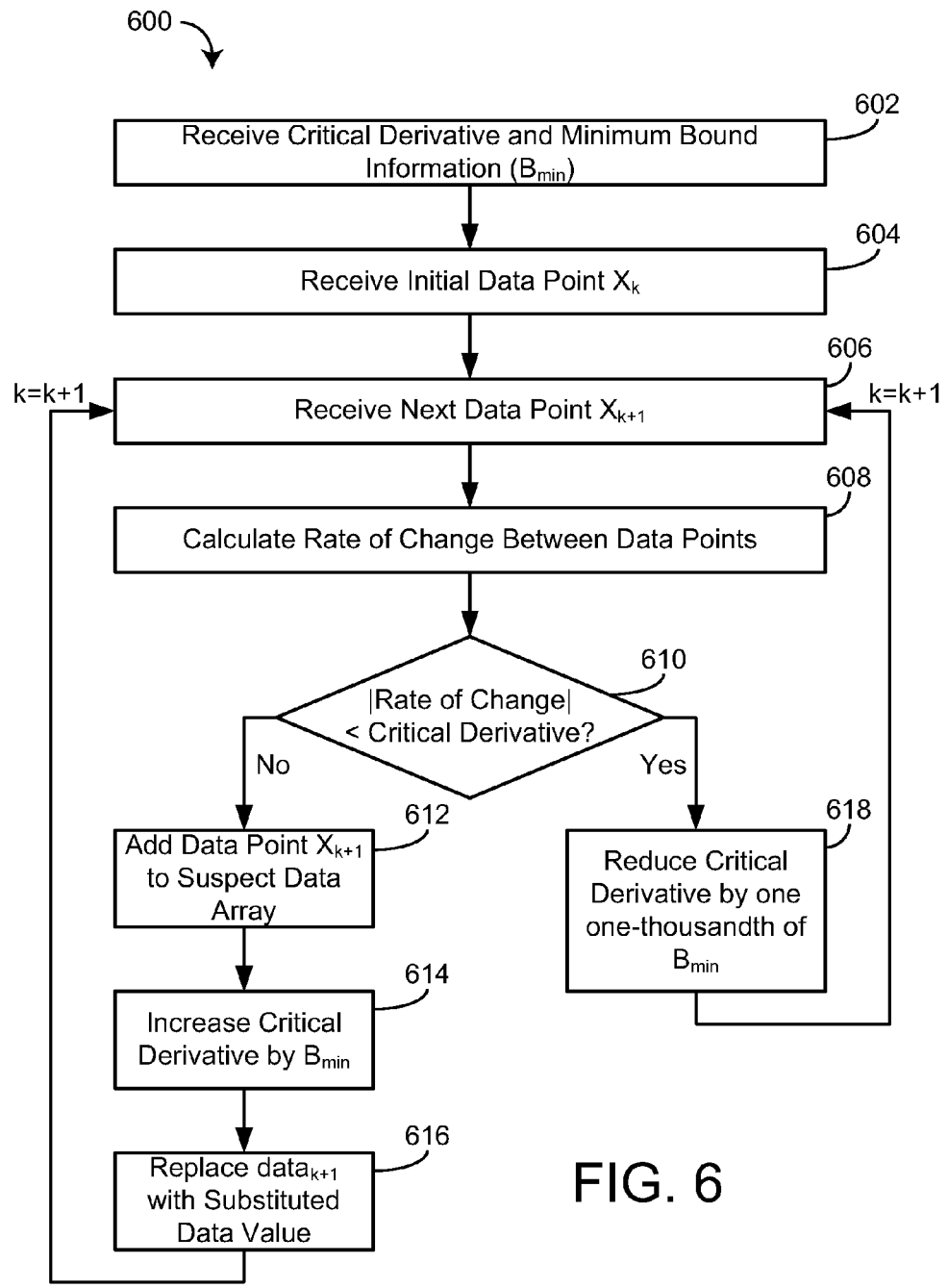
FIG. 6 is a flowchart showing an exemplary embodiment of the process used by the growth function to increase or decrease the critical derivative in an adaptive bounds error detection process, such as the process of FIG. 3.

Referring to FIG. 6, a flowchart depicting an exemplary embodiment of a growth process 600 is shown. The growth process 600 may be used to recursively adjust the critical derivative when implementing an adaptive derivative bounds process, such as the process 300 shown in FIG. 3. The growth process 600 may supplement or replace all or a portion of the process 300 described in FIG. 3.

In an exemplary embodiment, the growth process 600 includes receiving a data set including multiple data points. Each data point $x_k$ includes a data value $data_k$ and a data timestamp $time_k$. The growth process 600 also includes receiving a minimum bound $B_{min}$ on the critical derivative (step 602). In the exemplary embodiment, the minimum bound represents the smallest value that the critical derivative is permitted to reach after being adjusted by the growth process.

The process 600 includes receiving an initial data point $x_k$ from the data set (step 604) and a next data point $x_{k+1}$ (step 606). The process 600 further includes calculating the rate of change from one data point in the data set to another data point in the data set (step 608) by dividing the difference in data values by the difference in data timestamps. For example, the rate of change from data point $x_k$ to data point $x_{k+1}$ is determined by calculating $$\frac{data_{k+1} - data_k}{time_{k+1} - time_k}.$$

However, in other embodiments, the growth process 600 may be used to calculate the rate of change between two non-sequential data points. The growth process 600 then compares the absolute value of the rate of change between two data points to the critical derivative (step 610).

If the absolute value of the rate of change between two data points is less than the critical derivative, the growth process 600 reduces the critical derivative by a small amount (step 618). For the exemplary growth process 600 shown in FIG. 6, this step is accomplished by decreasing the critical derivative either (a) by one one-thousandth of the minimum bound $B_{min}$ or (b) to the minimum bound $B_{min}$, whichever would result in a greater critical derivative value. Although the exemplary embodiment reduces the critical derivative by one one-thousandth of the minimum bound $B_{min}$, other embodiments may reduce the critical derivative by a greater or lesser amount.

On the other hand, if the absolute value of the rate of change between two data points is greater than or equal to the critical derivative, the exemplary growth process 600 flags the data point with the latter timestamp $x_{k+1}$ as suspect data by adding the data point $x_{k\pm i}$ to a suspect data array (step 612). After flagging the suspect data point, the process 600 increases the critical derivative by a value equal to the minimum bound $B_{min}$ (step 614). Although the exemplary embodiment increases the critical derivative by $B_{min}$, other embodiments may increase the critical derivative by a greater or lesser amount.

In some embodiments, the growth process 600 may replace a suspect data value with a value corresponding to the maximum increase or decrease prescribed by the critical derivative and the difference in data timestamps between two data points (step 616). For example, the difference between data timestamps ($time_{k+1}$–$time_k$) may be multiplied by the critical derivative to determine the maximum possible change that would not be flagged as suspect. The maximum non-suspect change is then either (a) added to the first data value if $data_{k+1}$ is greater than $data_k$ or (b) subtracted from the first data value if $data_{k+1}$ is less than $data_k$. The resultant value is then substituted for $data_{k+1}$ to be used by the growth process 600 in successive iterations involving the data set.

Figure 7:
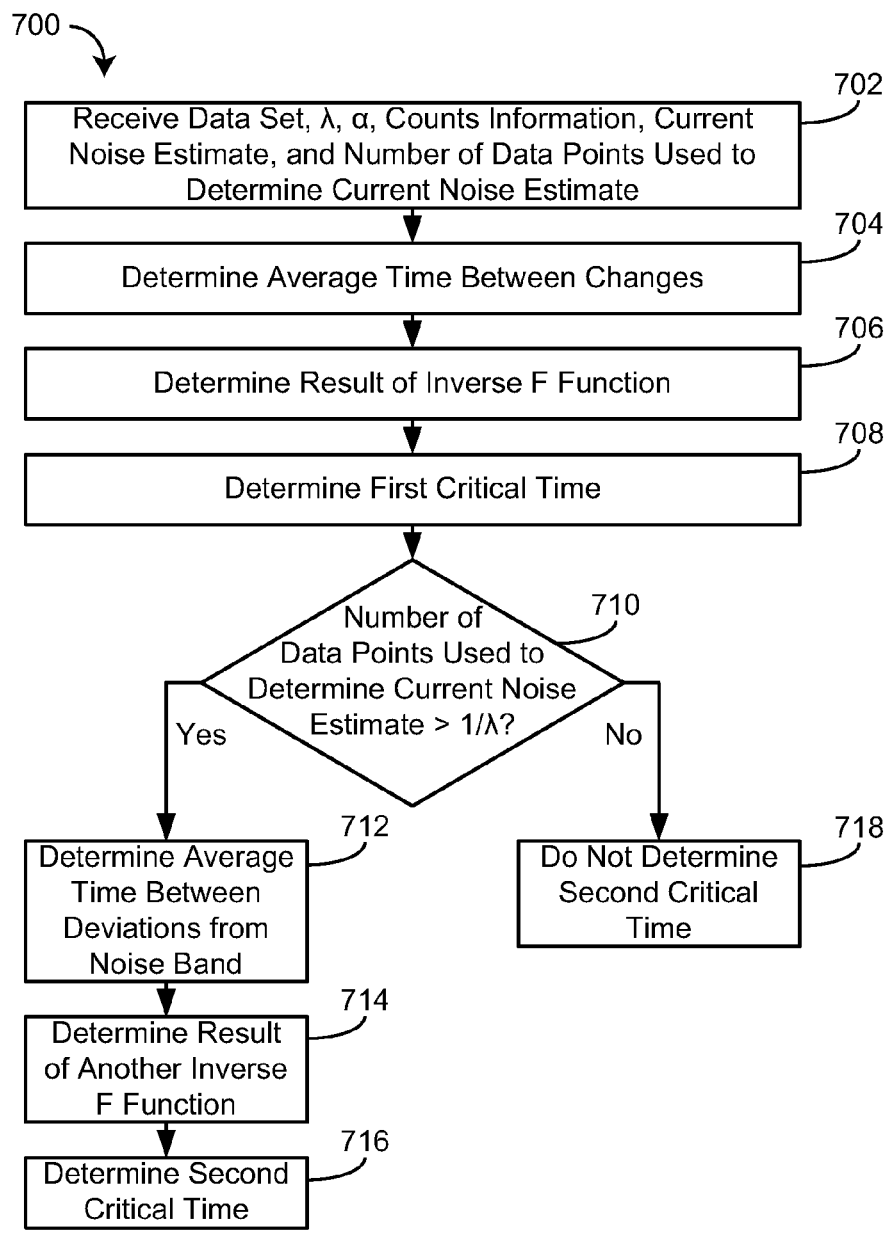
FIG. 7 is a flowchart showing an exemplary embodiment of the process used to calculate the first and second critical times in a stuck data detection process, such as the process of FIG. 4.
Figure 8:
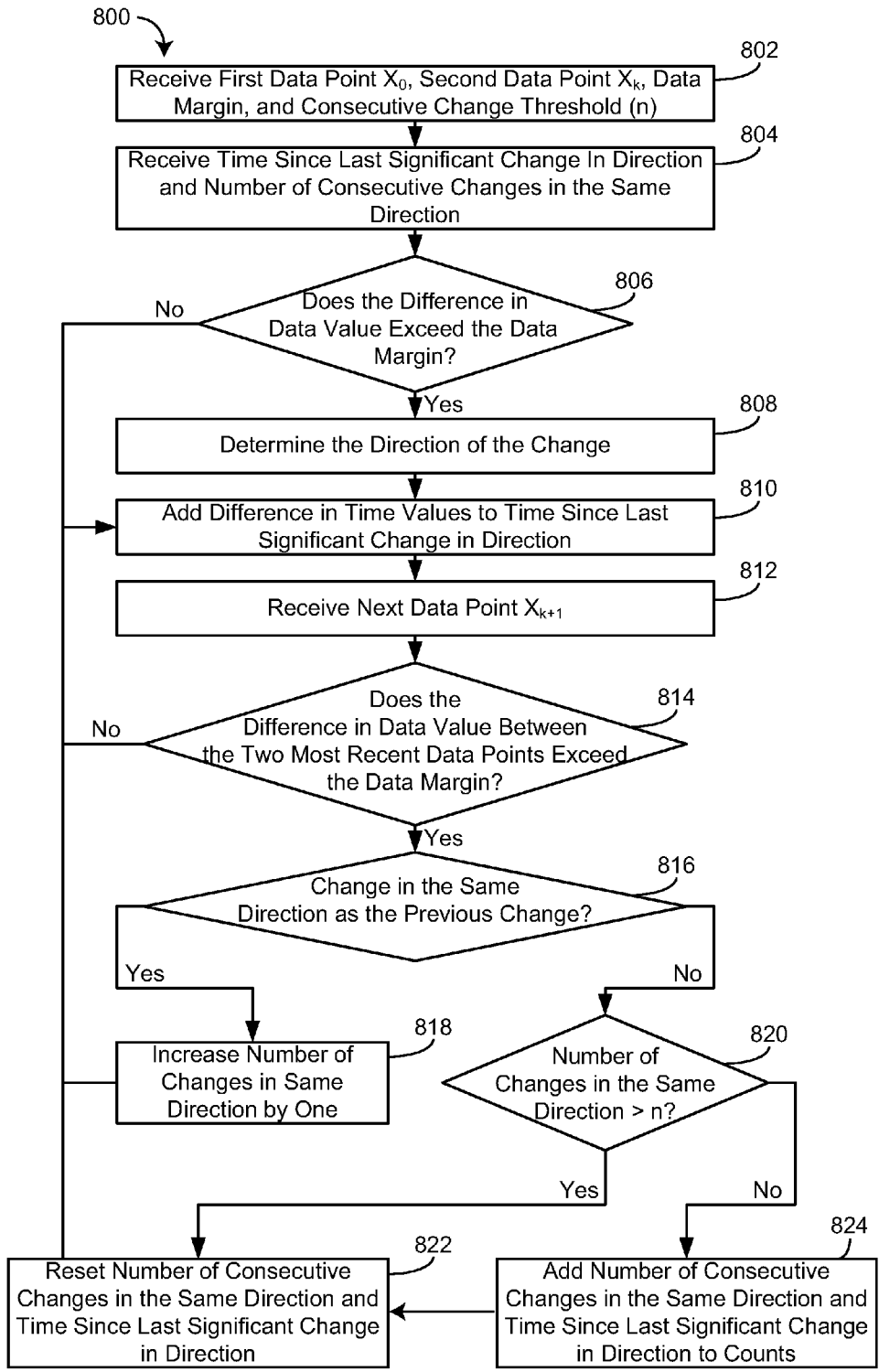
FIG. 8 is a flowchart showing an exemplary embodiment of a process to generate the count information used by the process of FIG. 7 to determine the first and second critical times.
Figure 9:
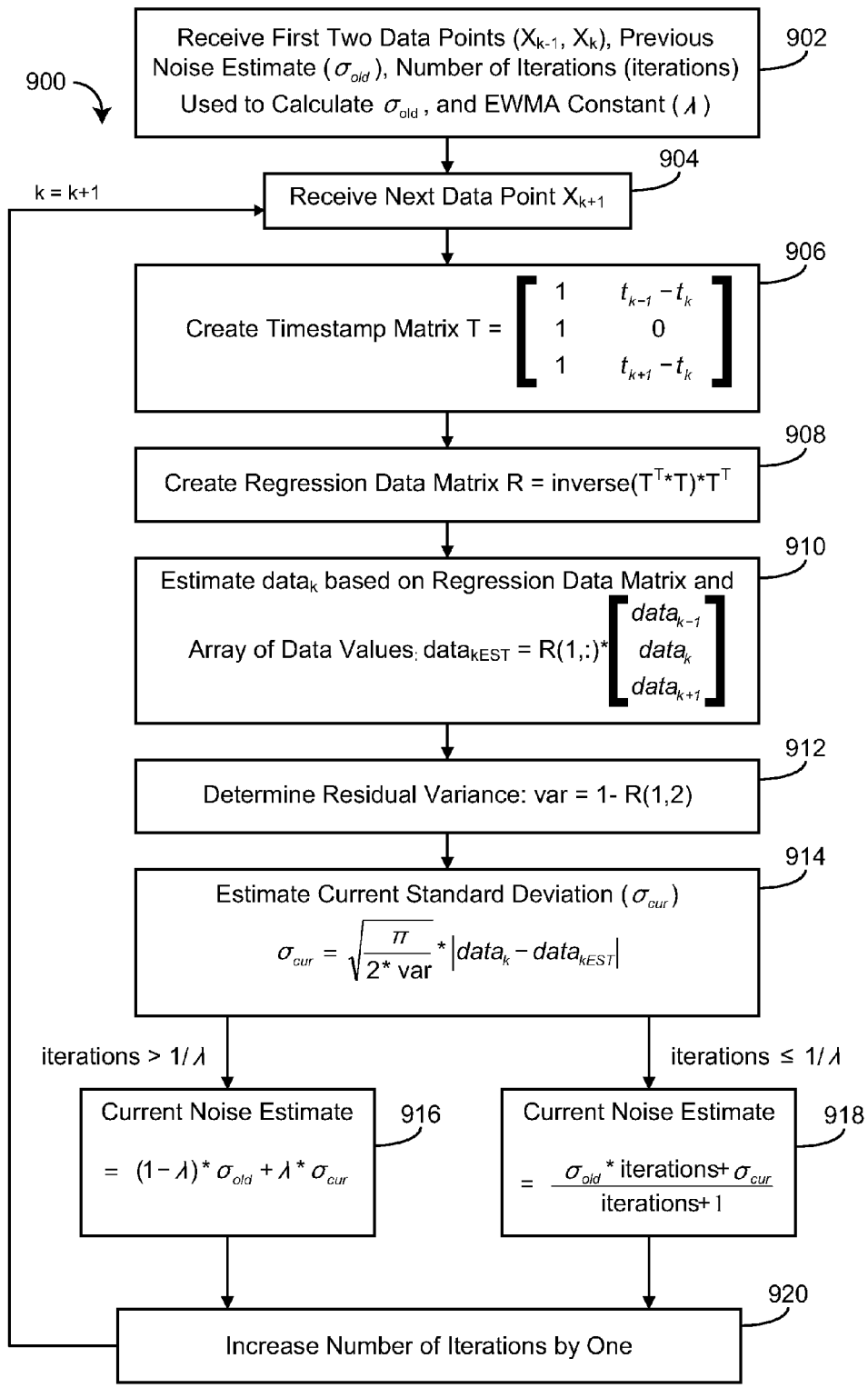
FIG. 9 is a flowchart showing an exemplary embodiment of a process used to compute the current noise estimate used by the process of FIG. 7 to determine the second critical time.

Referring now to FIGS. 7-9, sub-processes for completing a stuck data detection process (e.g., the process 400 shown in FIG. 4) are shown.

Referring specifically to FIG. 7, a flow chart of a process 700 used to determine parameters for the stuck data detection process 400 is shown, according to an exemplary embodiment. Specifically, the process 700 may be used to determine an inverse F-distribution and calculate a first critical time for use in the process 400. The first critical time is a time limit over which it can be determined that a sensor is stuck if the data values received from the sensor have not changed.

The process 700 may also be used to calculate a second critical time based on another inverse F-distribution. The second critical time is a time limit over which it can be determined that a sensor is stuck if the data values received from the sensor have not deviated from the noise band. The process 700 may be implemented recursively upon receiving each new data point or may be batch processed on a complete set of data.

The process 700 includes receiving a data set comprising multiple data points (step 702). Each data point $x_k$ includes a data value $data_k$ and a data timestamp $time_k$. The process 700 and step 702 also includes receiving a maximum false alarm rate α (step 702). The maximum false alarm rate is used to specify the allowed probability of a false alarm when processing the data. For example, an α value of 0.05 would indicate that the process 700 has a 5% chance to determine that the data are stuck when in fact they are not stuck.

The process 700 and step 702 further includes receiving a current noise estimation (e.g., from the process 900 of FIG. 9) and counts information (e.g., from the process 800 of FIG. 8), both described in greater detail below. The counts information may include the number of times the data values have changed and the time interval over which such changes have occurred. The counts information may also include the number of times the data values have deviated from the noise band and the time interval over which such deviations have occurred. The process 700 and step 702 further includes receiving a EWMA constant λ as described in FIG. 4.

In some embodiments, the process 700 further includes determining a first critical time (step 708) based on the average time between changes in data value (step 704) and an inverse F-distribution (step 706). In the exemplary process, the count information received from the process 800 of FIG. 8 is used to determine the average time between changes in data value. This quantity is determined by dividing the time over which changes in data value have occurred by the total number of changes in data value. If no changes in data value have occurred (e.g., the number of changes equals zero), then the average time between changes is set to infinity. In some embodiments, the average time between changes is then multiplied by the result of an inverse F function to determine the first critical time.

The result of an inverse F function is defined in terms of the of the cumulative distribution function (F) as $x=F^{-1}(p|v_1, v_2)=\{x:F(x|v_1,v_2)=p\}$, where $$p = F(x|v1, v2) = \int_0^x \frac{\Gamma\left[\frac{v_1+v_2}{2}\right]}{\Gamma\left(\frac{v_1}{2}\right)\Gamma\left(\frac{v_2}{2}\right)} \left(\frac{v_1}{v_2}\right)^{\frac{v_1}{2}} \frac{t^{\frac{v_1-2}{2}}}{\left[1+\frac{v_1}{v_2}t\right]^{\frac{v_1+v_2}{2}}} dt.$$

The process 700 includes using $(1-\alpha)$ as the x parameter, 2 as the $v_1$ parameter, and twice the total number of changes in data value as the $v_2$ parameter. However, other parameter values could be used, depending on the application. The $v_1$ and $v_2$ parameters represent the number of degrees of freedom in the numerator and denominator, respectively, of the cumulative distribution function F.

The result of the inverse F function is a number value signifying the upper limit of a confidence interval. For example, $F^{-1}(0.95,5,10)=3.3258$. This means that there exists a 95% chance that any given value in the distribution will be less than 3.3258. The purpose of the inverse F-distribution is to determine the multiplier applied to the average time between changes in determining the first critical time. Therefore, continuing the previous example, the first critical time would be 3.3258 times the average time between changes and it would be 95% likely that a non-stuck sensor will record a change in data value within the first critical time. From this information, it can be concluded with 95% certainty that a sensor is stuck if the data value has not changed within the first critical time.

In some embodiments, the process 700 of FIG. 7 further includes determining a second critical time (step 716) based on the average time between deviations from the noise band (step 712) and another inverse F-distribution (step 714). However, because a significant number of data points are required to obtain a useful estimate of the noise level, the process of FIG. 7 may include checking the number of data points on which the current estimate of the noise level is based (step 710). If the number of data points used to determine the current noise estimate is less than $1/\lambda$, then the second critical time is not calculated (step 718).

Conversely, if the number of data points used to calculate the current noise estimate exceeds $1/\lambda$, then the counts information received from the process 800 of FIG. 8 and the current estimation of the noise level are used to determine the average time between deviations from the noise band (step 712). This quantity is determined by dividing the total time over which deviations from the noise band have occurred by the total number of such deviations. If no deviations from the noise band have occurred (e.g., the number of deviations equals zero), then the average time between deviations is set to infinity. In some embodiments, the average time between deviations is then multiplied by the result of another inverse F function (step 714) to determine the second critical time (step 716). The second critical time signifies the time limit past which it can be determined that a data sensor is stuck if the data from the sensor have not deviated from the noise band.

Referring to FIG. 8, a flow chart is shown depicting an exemplary process 800 to determine the number of significant changes in data value between data points in a data set and the time interval over which such changes occur. The process 800 may be used by the processes 400 of FIG. 4 or 700 of FIG. 7 to determine the average time between changes. The process 800 includes receiving a first data point $x_0$ and another data point $x_k$ from a data source (step 802). Each data point pair has a data value ($data_0$, $data_k$) and a data timestamp ($time_0$, $time_k$). The process 800 and step 802 also includes receiving a consecutive change threshold n. The process 800 includes receiving a time since the last significant change in direction and the number of consecutive changes in the same direction (step 804).

The process 800 further includes receiving a data margin (step 802) and determining whether the difference in data value between two data points exceeds the data margin (step 806). The data margin is used to determine whether a change in data value from one data point to the next is significant. The data margin may be calculated automatically, received from another process, specified by a user, or otherwise received from any other source. If the difference between data values meets or exceeds the data margin, the change is considered significant. On the other hand, if the difference between data values is less than the data margin, the change is considered insignificant and consequently disregarded.

The process 800 further includes determining the direction of the change (if any) in data value between two second data points (step 808). For example, if the value of $data_k$ is greater than the value of $data_0$, the direction of the change is positive. Conversely, if the value of $data_k$ is less than the value of $data_0$, the direction of the change is negative.

The process 800 further includes adding the difference in data timestamps to a variable quantity used to record the time since the data last had a significant change in direction (step 810). In the exemplary embodiment, the value of this variable starts at zero. However, the "time since last significant change in direction" variable may be received by the process 800 as a non-zero quantity if, for example, the data used by the process 800 are the continuation of a previous data set or if the process 800 is being run recursively.

The process 800 further includes receiving another data point $x_{k+1}$ having a data value $data_{k+1}$ and a data timestamp $time_{k+1}$ (step 812) and determining whether the difference in data value between the two most recent data points ($data_{k+1} - data_k$) exceeds the data margin (step 814). In the exemplary embodiment, if the difference in data values does not exceed the data margin, the difference in data timestamps between the two most recent data points ($time_{k+1} - time_k$) is added to the "time since last significant change in direction" variable.

Conversely, if the difference in data value between the two most recent data points meets or exceeds the data margin, the process 800 involves determining whether the change in data value is in the same direction as the previous change (e.g., whether the data value increases again or decreases again) (step 816).

If the change in data value is in the same direction as the previous change, the process includes increasing a variable quantity used to record the number of consecutive changes in data value that have been in the same direction (step 818). In the exemplary embodiment, the value of this variable starts at zero. However, the "number of consecutive changes in the same direction" variable may be received by the process 800 as a non-zero quantity if, for example, the data used by the process are the continuation of a previous data set or if the process 800 is being run recursively. Additionally, when a change is in the same direction as the previous change, the exemplary process includes adding the difference in data timestamps to the "time since last significant change in direction" variable.

If the change in data value is in the opposite direction from the previous change, the exemplary process 800 includes determining whether the number of previous consecutive changes in the same direction is greater than a consecutive change threshold n (step 820). In the exemplary embodiment, the consecutive change threshold may be calculated automatically, received from another process, specified by a user, or otherwise received from any other source. The purpose of the consecutive change threshold is to specify a number of consecutive changes in the same direction past which it is unlikely that the data would be indicative of steady-state operation. In other words, if the number of consecutive changes in the same direction exceeds the consecutive change threshold, it is likely that the data is either increasing or decreasing in response to a non-steady state event such as a set point change or a load disturbance.

If the number of previous consecutive changes in the same direction is greater than or equal to the consecutive change threshold, the exemplary process 800 disregards the data points representing such changes to avoid skewing the data associated with steady-state control. The process 800 accomplishes this step by resetting the "number of consecutive changes in the same direction" variable as well as the "time since last significant change in direction" variable (step 822). In the exemplary process, these two variables are reset without adding their quantities to the total counts.

However, if the number of previous consecutive changes in the same direction is less than the consecutive change threshold, the exemplary process 800 includes adding the number of previous consecutive changes in the same direction, as well as the time interval over which such changes occurred, to the total counts (step 824).

Total counts is an array including of (1) the number of significant changes in data value determined by the process 800 and (2) the time over which such changes have occurred. Counts are accumulated by transferring the balance of the "number of consecutive changes in the same direction" variable and the "time since last significant change in direction" variable upon a change in data direction, provided that the number of previous consecutive changes in the same direction does not exceed the consecutive change threshold. Total counts may be used to determine some of the quantities used by the process 700 of FIG. 7, such as average time between changes.

Referring now to FIG. 9, a flowchart depicting the noise estimation processes 900 used by FIG. 4 and FIG. 7 to compute the current noise estimate is shown. Although the flowchart of FIG. 9 sets forth several discrete steps which may be used to determine the current noise estimate, it is appreciated that some of the steps may be combined, broken into multiple steps, rearranged, or otherwise reconfigured to accomplish the same result. The process 900 may be used to estimate noise in the environment in which data points are being measured or calculated. The process 900 includes receiving a first data point $x_{k-1}$ and a second data point $x_k$ from a data source (step 902). Each data point has a data value ($data_{k-1}$, $data_k$) and a data timestamp ($time_{k-1}$, $time_k$).

The process 900 further includes receiving a previous noise estimate $\sigma_{old}$ the number of iterations performed to calculate the previous noise estimate, and an exponentially weighted moving average (EWMA) constant $\lambda$ (step 902). The EWMA constant functions to smooth the current noise estimate. A low $\lambda$ value may be used when the expected error in the noise estimate is low whereas a high $\lambda$ value may be used to provide greater adaptability when the expected error in the noise estimate is high. The EWMA constant $\lambda$ may be calculated automatically, received from another process, specified by a user, or otherwise received from any other source. In the exemplary embodiment, the previous noise estimate $\sigma_{old}$ and the number of iterations start at zero. However, both variables may be received by the process as non-zero quantities if, for example, the data used by the process are the continuation of a previous data set or if the process is being implemented recursively.

The process 900 further includes receiving a next data point $x_{k+1}$ from the data set (step 904). The next data point also has a data value $data_{k+1}$ and a data timestamp $time_{k+1}$. Using the three most recently received data points, a timestamp matrix [T] is created (step 906). In the exemplary embodiment, the timestamp matrix is a three by two matrix. As shown in FIG. 9, the first column of the timestamp matrix contains all ones whereas the second column of the timestamp matrix contains the values ($time_{k-1}$–$time_k$), 0, and ($time_{k+1}$–$time_k$) descending from top to bottom.

The process 900 further includes creating a regression data matrix [R] (step 908). The regression data matrix is created by (1) taking the transpose of the timestamp matrix $[T]^T$ and multiplying such transpose by the timestamp matrix itself and (2) multiplying the inverse matrix of the resultant product by the transpose of the timestamp matrix. In other words, $[R]=inverse([T]^T*[T])*[T]^T$ as shown in FIG. 9.

The process 900 further includes estimating the value of $data_k$ ($data_{kEST}$) based on the regression data matrix and the three by one array of data values $data_{k-1}$, $data_k$, and $data_{k+1}$ descending from top to bottom (step 910). The value of $data_{kEST}$ is determined by multiplying the top row of the regression data matrix by the array of data values as shown in FIG. 9.

The process 900 further includes determining the residual variance (var) by subtracting the value in the first row and second column of the regression data matrix R(1,2) from the integer 1 (step 912). In other words, var=1–R(1,2).

Once the residual variance has been calculated, an estimate of the current standard deviation $\sigma_{cur}$ can be determined by multiplying the square root of the quantity [$\pi$ divided by twice the variance] by the absolute value of the difference between the estimated value $data_{kEST}$ and the actual value of $data_k$ (step 914). In other words, $$\sigma_{cur} = \sqrt{\frac{\pi}{2*\text{var}}} * |data_k - data_{kEST}|.$$

Finally, the process 900 includes determining the current noise estimate. As shown in FIG. 9, if the value of the variable recording the number of iterations is greater than 1/$\lambda$ then the current noise estimate is updated by adding the product of (1/$\lambda$) and the previous noise estimate to the product of $\lambda$ and the current standard deviation $\sigma_{cur}$ (step 916). Otherwise, the current noise estimate is determined by (1) multiplying the previous noise estimate $\sigma_{old}$ by the variable recording the number of iterations, (2) adding the resultant product to the current standard deviation $\sigma_{cur}$, and (3) dividing the resultant sum by one plus the number of iterations (step 918). Once the current noise estimate has been determined, the variable recording the number of iterations is increased by one (step 920).

Using the systems and methods disclosed above, data system 100 is able to automatically detect suspect data and automatically cleanse the suspect data. In some embodiments, data system 100 may indicate instances of suspect data detected by suspect data detection module 120 to a user or user device (e.g., mobile phone, laptop computer, client computer, user interface server, etc.) prior to cleansing the suspect data using data cleansing module 140. The user may be able to choose which data cleanser to use with the suspect data and may elect whether to cleanse the data and/or whether to retain some or all of the raw suspect data. Data system 100 may indicate all instances of suspect data to the user or may indicate only certain instances of suspect data which exceed a fault indication threshold. The fault indication threshold may relate to a magnitude of a fault in the suspect data (e.g., the amount by which the data exceed acceptable bounds), may relate to a quantity (e.g., number, percentage, proportion, etc.) of suspect data points in a data set, or may relate to whether or not a pattern has developed (e.g., whether the number of faults or magnitude of such faults has grown). The fault indication threshold may be specified by a user, or may be determined automatically by the data system 100.

In some embodiments, data system 100 may replace suspect data in a data set with cleansed data. Prior to cleansing, data system 100 may create a copy of some or all of the suspect data to allow for user inspection or selection of the original raw data. In other embodiments, data system 100 may use the raw data to create a separate set of cleansed data without altering or replacing any of the raw data in the raw data set. Thus, both the raw data and the cleansed data may be available for use in downstream processes or applications.

In an exemplary embodiment, the system may generate user interfaces for allowing the user to view statistics regarding the data fault detection and cleansing. For example, the user interfaces may include tallies indicating the percentage of the data which is potentially suspect, the percentage of the data which was replaced due to error detection and cleansing, the number of total detected faults, or other totals for allowing the user to conduct his or her own evaluation of the quality of the data. The user interface generated by the system may include controls for allowing the user to select between different cleansing methods or may include controls for allowing the user to change thresholds of the system (e.g., to reduce the number of false positives). In the same or yet other embodiments, the user interfaces can include controls for allowing the user to set alert or alarming thresholds. In other words, the user may be able to adjust how frequently or upon which circumstances the system messages the user regarding detected and cleansed faults. The user may decide that he or she does not want to receive frequent messages regarding routine or normal fault detection and cleansing, but that he or she would like to be notified when faults exceed a certain "problem" threshold. The user interfaces may include controls for allowing the user to investigate the data behind the detected and cleansed faults. In other words, the user interfaces may allow the user to view which machine or subsystem generated the faults, view data adjacent to the detected faulty data, or to otherwise view raw or compiled information regarding the faulty or potentially faulty data.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

We claim:

1. A method for detecting and cleansing suspect building automation system data, comprising:
   using processing electronics to automatically determine which of a plurality of error detectors and which of a plurality of data cleansers to use with building automation system data;
   using the processing electronics to automatically detect errors in the data and cleanse the data using a subset of the error detectors and a subset of the cleansers;
   wherein the processing electronics automatically determine which of the plurality of data cleansers to use with the building automation system data prior to cleansing the data;
   flagging a data point as suspect data if an absolute value of a rate of change in data value between the data point and a previous data point is greater than a critical derivative; and
   using a growth function to either:
   (a) increase the critical derivative if the absolute value of the rate of change in data value between the data points is greater than the critical derivative, or (b) decrease the critical derivative if the absolute value of the rate of change in data value between the data points is less than or equal to the critical derivative.

2. The method of claim 1, wherein the processing electronics use an indication of data type to determine which of the error detectors or which of the data cleansers to use with the data.

3. The method of claim 1, wherein the processing electronics use information concerning how the data will be used in subsequent processing to determine which of the error detectors or which of the data cleansers to use with the data.

4. The method of claim 1, wherein the processing electronics use information concerning which of the error detectors is used with the data or the type of error determined by the detectors to determine which of the data cleansers to use with the data.

5. The method of claim 1, further comprising:
using the processing electronics to generate a message for transmission to a user, wherein the message for transmission to the user indicates the presence of a detected error and the type of the detected error.

6. The method of claim 1, wherein the plurality of cleansers comprise at least two of:
(a) a module that replaces the suspect data with a not-a-number value;
(b) a module that replaces the suspect data with a value determined by interpolation;
(c) a module that formats the data to a uniform format; and
(d) a module that sorts the data.

7. The method of claim 1, wherein the plurality of error detectors comprise at least three of:
(a) a static bounds error detector;
(b) an adaptive bounds error detector;
(c) a static derivative bounds error detector;
(d) an adaptive derivative bounds error detector; and
(e) a stuck value error detector.

8. The method of claim 7, wherein the static bounds error detector uses a process comprising:
receiving a data point having a data value;
receiving a minimum and maximum bound information; and
flagging the data point as suspect data if the data value is not within the minimum and maximum bounds.

9. The method of claim 7, wherein the adaptive bounds error detector uses a process comprising:
receiving a critical value and a data window having a window size;
receiving data points until the number of data points collected equals the window size;
estimating a data spread and a central tendency for the data points in the current data window;
receiving a next data point having a data value; and
flagging the next data point as suspect data if the absolute value of the difference between the data value and the central tendency is greater than the product of the critical value and the data spread.

10. The method of claim 7, wherein the static derivative bounds error detector uses a process comprising:
receiving a critical derivative, an initial data point and a next data point, each data point having a data value and a data timestamp;
determining a rate of change in data value between the initial data point and the next data point; and
flagging the next data point as suspect data if the rate of change is greater than the critical derivative.

11. The method of claim 7, wherein the adaptive derivative bounds error detector uses a process comprising:
receiving a critical derivative and a growth function;
collecting an initial data point having an initial data value and an initial data timestamp and a next data point having a next data value and a next data timestamp;
determining the rate of change in data value between the data points by dividing the difference in data values by the difference in data timestamps;
flagging the next data point as suspect data if the absolute value of the rate of change in data value between the data points is greater than the critical derivative; and
using the growth function to either
(a) increase the critical derivative if the absolute value of the rate of change in data value between the data points is greater than the critical derivative, or
(b) decrease the critical derivative if the absolute value of the rate of change in data value between the data points is less than or equal to the critical derivative.

12. The method of claim 7, wherein the stuck value error detector uses a process comprising:
receiving a maximum false alarm rate and a plurality of data points, each data point having a data value and a data timestamp;
determining an average time between changes in data value;
determining a first critical time based on the average time between changes and the maximum false alarm rate;
receiving a next data point having a next data value and a next data timestamp;
determining a difference between the next data timestamp and the timestamp of the most recent previous data point in the plurality of data points with a data value different from the next data value; and
flagging the next data point as stuck if the difference between the next data timestamp and the timestamp of the most recent previous data point with a data value different from the next data value is greater than the first critical time.

13. The method of claim 12, wherein the stuck value error detector uses a process further comprising:
determining a current noise estimate and using the current noise estimate to calculate a noise band;
determining an average time between deviations from the noise band;
determining a second critical time based on the average time between deviations from the noise band and the maximum false alarm rate;
determining a difference between the next data timestamp and the timestamp of the most recent previous data point in the plurality of data points with a data value significantly different from the next data value; and
flagging the next data point as stuck if the difference between the next data timestamp and the timestamp of the most recent previous data point with a data value significantly different from the next data value is greater than the second critical time, wherein a difference in data value between two data points is significantly different if the difference represents a deviation from the noise band.

14. A computerized method for detecting suspect building automation system data, the method comprising:
receiving, at a processing circuit of an adaptive bounds error detector, a critical value and a data window having a window size;
collecting, at the processing circuit, data points until the number of data points collected equals the window size;

using robust statistics to estimate, by the processing circuit, data spread and central tendency in the current data window;

collecting a next data point having a data value;

determining, by the processing circuit, whether the absolute value of the difference between the data value and the central tendency is greater than the product of the critical value and the data spread;

flagging, by the processing circuit, the next data point as suspect data in response to a determination that the absolute value of the difference between the data value and the central tendency is greater than the product of the critical value and the data spread;

replacing an oldest of the collected data points with the next data point to define a new data window;

calculating an updated critical value, an updated data spread, and an updated central tendency in the new data window;

repeating the steps of 'collecting a next data point,' 'determining,' and 'flagging' using the updated critical value, the updated data spread, the updated central tendency, and the newly-collected next data point;

flagging, by the processing circuit, the next data point as suspect data if an absolute value of a rate of change in data value between the next data point and a previous data point is greater than a critical derivative; and using a growth function to either:
  (a) increase the critical derivative if the absolute value of the rate of change in data value between the data points is greater than the critical derivative, or
  (b) decrease the critical derivative if the absolute value of the rate of change in data value between the data points is less than or equal to the critical derivative.

15. A computerized method for detecting suspect building automation system data, the method comprising:

receiving, at a processing circuit of an adaptive derivative bounds error detector, a critical derivative and a growth function;

collecting, at the processing circuit, an initial data point having an initial data value and an initial data timestamp and a next data point having a next data value and a next data timestamp;

determining, by the processing circuit, the rate of change in data value between the data points by dividing the difference in data values by the difference in data timestamps;

flagging, by the processing circuit, the next data point as suspect data if the absolute value of the rate of change in data value between the data points is greater than the critical derivative; and the processing circuit using the growth function to either
  (a) increase the critical derivative if the absolute value of the rate of change in data value between the data points is greater than the critical derivative, or
  (b) decrease the critical derivative if the absolute value of the rate of change in data value between the data points is less than or equal to the critical derivative.

16. A computerized method for detecting suspect building automation system data, the method comprising:

receiving, at a processing circuit of a stuck data detector, a maximum false alarm rate and a plurality of data points, each data point having a data value and a data timestamp;

determining, by the processing circuit, an average time between changes in data value;

determining, by the processing circuit, a first critical time based on the average time between changes and the maximum false alarm rate;

receiving, at the processing circuit, a next data point having a next data value and a next data timestamp;

determining, by the processing circuit, whether the difference between the next data timestamp and the timestamp of the most recent previous data point with a data value different from the next data value is greater than the first critical time;

flagging, by the processing circuit, the next data point as stuck in response to a determination that the difference between the next data timestamp and the timestamp of the most recent previous data point with a data value different from the next data value is greater than the first critical time;

flagging, by the processing circuit, the next data point as suspect data if the absolute value of a rate of change in data value between the next data point and a previous data point is greater than a critical derivative; and using the growth function to either:
  (a) increase the critical derivative if the absolute value of the rate of change in data value between the data points is greater than the critical derivative, or
  (b) decrease the critical derivative if the absolute value of the rate of change in data value between the data points is less than or equal to the critical derivative.

17. The method of claim 16, further comprising:

determining a current noise estimate and using the current noise estimate to calculate a noise band;

determining an average time between deviations from the noise band; determining a second critical time based on the average time between deviations from the noise band and the maximum false alarm rate; and flagging the next data point as stuck if the difference between the next data timestamp and the timestamp of the most recent previous data point with a data value significantly different from the next data value is greater than the second critical time, wherein a difference in data value between two data points is deemed significantly different if the difference represents a deviation from the noise band.

18. The method of claim 17, wherein the first critical time is determined using a process comprising:

receiving counts information and the maximum false alarm rate, wherein the counts information includes a total number of changes in data value and a total time over which such changes occurred;

determining the average time between changes in data value by dividing the total time over which such changes occurred by the total number of changes in data value;

using the maximum false alarm rate and the total number of changes in data value to calculate the result of an inverse F-function; and determining the first critical time by multiplying the average time between changes in data value by the result of the inverse F-function.

19. The method of claim 17, wherein the second critical time is determined using a process comprising:

receiving counts information and the maximum false alarm rate, wherein the counts information includes a total number of deviations from the noise band and a total time over which such deviations occurred;

determining the average time between deviations from the noise band by dividing the total time over which such deviations occurred by the total number of deviations from the noise band;

using the maximum false alarm rate and the total number of deviations from the noise band to calculate the result of another inverse F-function; and determining the second critical time by multiplying the average time between deviations from the noise band by the result of the other inverse F-function.

20. The method of claim 17, wherein the current noise estimate is determined using a process comprising:
receiving a previous noise estimate, a number of iterations used to calculate the previous noise estimate, an exponentially weighted moving average (EWMA) constant, and the plurality of data points, each data point having a data value and a data timestamp;
estimating the value of a data point using regression data, wherein the regression data is created using the data timestamps;
calculating a residual variance using the regression data;
using the residual variance and the estimated data value to estimate a current standard deviation; and
using the previous noise estimate, the number of iterations used to calculate the previous noise estimate, the EWMA constant, and the current standard deviation to determine the current noise estimate.

* * * * *